March 18, 1947. J. MacR. NEWMAN 2,417,564
VEGETABLE AND FRUIT COMMINUTING DEVICE
Filed March 30, 1944 2 Sheets-Sheet 2

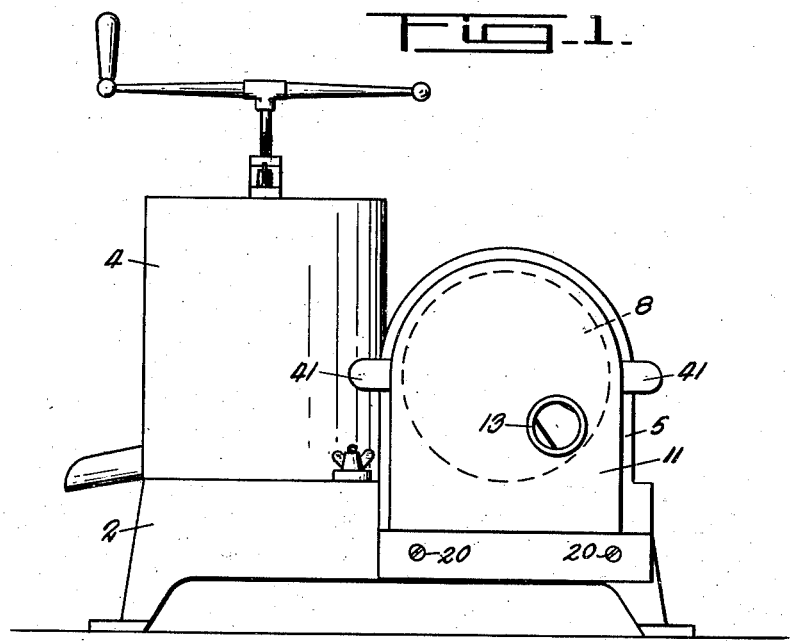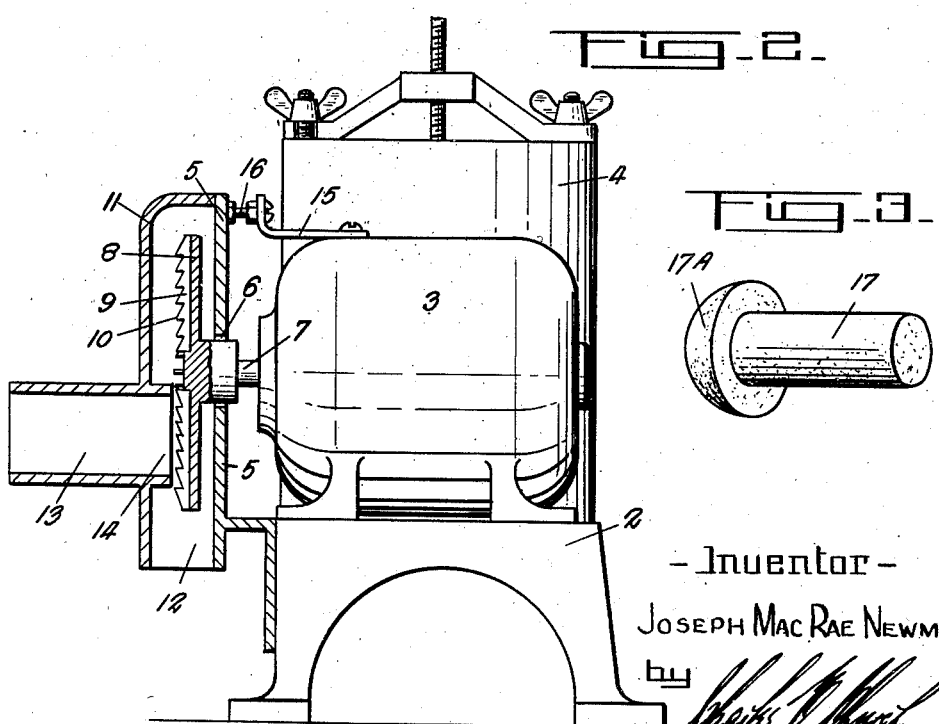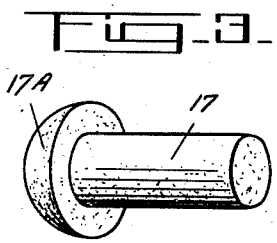

- Inventor -
JOSEPH MacRae NEWMAN
by
Atty.

Patented Mar. 18, 1947

2,417,564

UNITED STATES PATENT OFFICE 2,417,564

VEGETABLE AND FRUIT COMMINUTING DEVICE

Joseph MacRae Newman, Weston, Ontario, Canada

Application March 30, 1944, Serial No. 528,796

2 Claims. (Cl. 146—177)

My invention relates to improvements in vegetable and fruit comminuting device, and the object of my invention is to produce a device which will efficiently and quickly triturate the vegetables or fruit being processed.

A further object of my invention is to provide a toothed disc revolving about a horizontal axis and against which the fruits or vegetables are pressed for triturating and also to provide an adjustment whereby the clearance between the food feeding tube and the teeth of the triturating disc can be finely adjusted so that a maximum efficiency is obtained.

With the foregoing and other objects in view as shall hereinafter appear, my invention consists of a device as described and illustrated in the accompanying drawings in which—

Figure 1 is a front elevational view of my device.

Figure 2 is an end elevational view thereof showing the triturating disc and housing therefor in section.

Figure 3 is a perspective view of the feeding plunger.

Like characters of reference indicate corresponding parts in the different views in the drawings.

Figure 4:
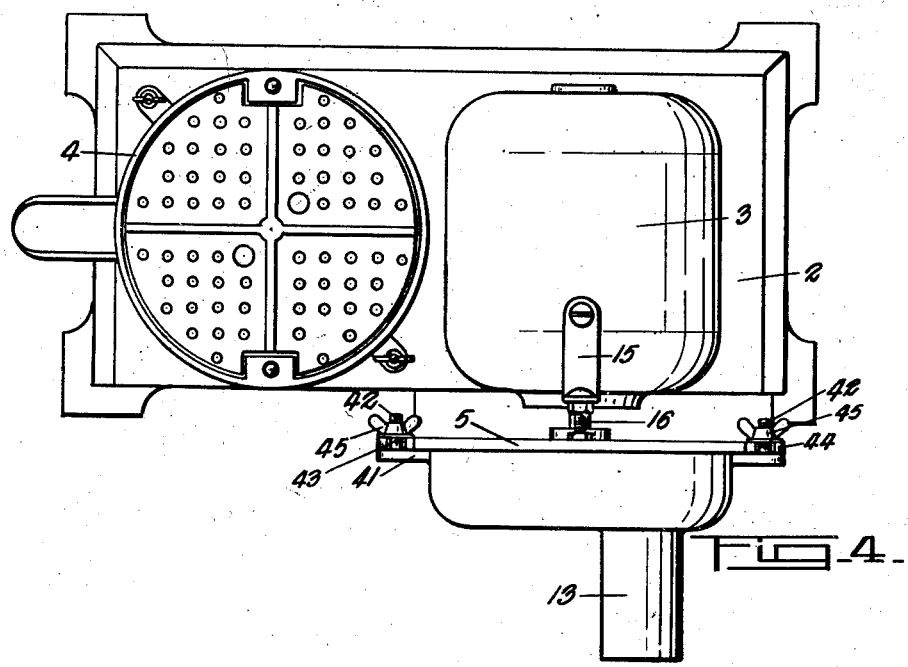
Figure 4 is a plan view of my device, the bridge member squeezing plate and press actuating screw being removed.
Figure 5:
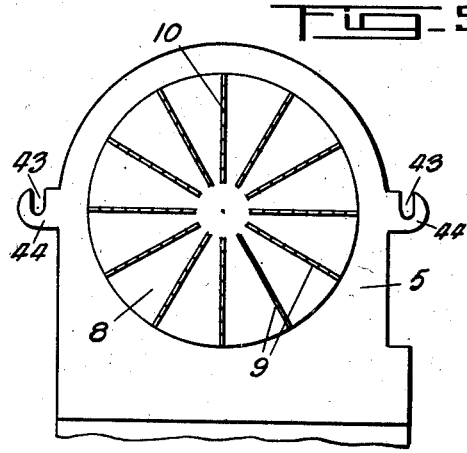
Figure 5 is a front elevational view of the triturating disc, the housing cover being removed.

My device is carried upon a suitable stand 2, an electric motor 3 being mounted upon one end of the stand and a screw press 4 mounted upon the other end of the stand. A plate 5 is mounted upon the front of the stand 2 in front of the motor 3 and has an orifice 6 in alignment with the shaft 7 of the motor. The plate 5 is secured to the stand 2 by screws 20 extending through the lower portion of the plate and threaded into the stand 2. The shaft 7 projects through the orifice 6 and carries a triturating disc 8. The outer face of the disc 8 contains a plurality of radially extending strips 9 which are made of steel and molded into the disc 8. The outer edges of the strips 9 are formed with teeth 10.

The outer face of the plate 5 supports a housing 11 with a rounded top and parallel sides and, which is spaced away from the disc 8. The housing 11 is open at its bottom to provide an orifice 12 underneath the disc and through which the triturated fruit or vegetables drop. The housing 11 is formed with a feeding tube 13 open at both ends and positioned so that its inner end is opposite the teeth on the revolving disc 8. The inner portion 14 of the tube 13 extends inwardly with its face in close proximity to the crowns of the teeth as clearly shown in Figure 2.

A strap 15 extends from the top of the motor 3 to an adjusting screw 16 on the back of the plate 5. The end of the strap 15 is turned upwardly and the screw 16 extends therethrough and is threaded into the plate 5. By adjusting the screw 16, the plate 5 and housing 11 carried thereon can be bent or sprung inwardly or outwardly to a slight degree whereby the clearance between the teeth and the inner end 14 of the tube 13 can be adjusted. Vegetables or fruit are fed into the device through the tube 13 by means of the feeding plunger 17, the knob 17A of which is held in the hand of the operator.

In order to facilitate ready removal of the housing 11 for cleaning, the housing is formed with two lugs 41 which carry studs 42 receivable into open-ended slots 43 in lugs 44 which extend from the sides of the plate 5. Wing nuts 45 are threaded upon the studs to engage the back faces of the lugs 44.

From the foregoing description it will be apparent that I have devised a very efficient and yet simple device for triturating vegetables or fruit, and although I have described a particular embodiment of my invention, it is to be understood that I can make such changes and alterations as I may from time to time deem necessary without departing from the spirit of my invention as set forth in the appended claims.

What I claim as my invention is:

1. In a device of the character described, a supporting stand upon which the device is mounted, a disc rotatable about a horizontal axis and against which vegetables are pressed to be triturated, radial strips extending from the face of the disc, teeth cut in the edges of the strips, a vertical stationary plate positioned behind the disc and having its lower portion only rigidly secured to the stand, a housing detachably mounted on the plate and in which the disc is contained and formed with a discharge orifice in its bottom, and an open-ended tube protruding from the housing opposite the toothed face of the disc and through which vegetables are fed to bear against the teeth to be triturated, a solid support mounted on the stand and positioned behind the plate, and a connection adjustable in length and extending between the solid support and the upper portion of the plate whereby adjustment of the connection flexes the plate so that the housing mounted on the plate is moved relatively to the face of the disc.

2. In a device of the character described, a supporting stand upon which the device is mounted, a disc rotatable about a horizontal axis and against which vegetables are pressed to be triturated, radial strips extending from the face of the disc, teeth cut in the edges of the strips, a vertical stationary plate positioned behind the disc and having its lower portion rigidly secured to the stand, a housing formed with a front face and substantially parallel sides which are spaced apart a distance greater than the diameter of the disc, the upper ends of the sides merging into a housing top, the lower ends of the sides being exposed whereby a discharge orifice is formed in the bottom of the housing and being of a width greater than the diameter of the disc, said housing being detachably mounted upon the plate and in which the disc is contained, an open-ended tube protruding from the housing opposite the toothed face of the disc and through which vegetables are fed to bear against the teeth to be triturated, a solid support mounted on the stand and positioned behind the plate, and a connection adjustable in length and extending between the solid support and the upper portion of the plate whereby adjustment of the connection flexes the plate so that the housing mounted on the plate is moved relatively to the face of the disc.

JOSEPH MacRAE NEWMAN.

REFERENCES CITED

The following references are of record in the file of this patent:

UNITED STATES PATENTS

| Number | Name | Date |
| --- | --- | --- |
| 2,273,093 | Drachenberg | Feb. 17, 1942 |
| 2,315,028 | Thomas | Mar. 30, 1943 |
| 1,983,666 | Hoe | Dec. 11, 1934 |
| 1,369,978 | Moore | Mar. 1, 1921 |
| 1,456,257 | Stevenson | May 22, 1923 |
| 33,581 | Gates | Oct. 29, 1861 |
| 74,361 | Holderman | Feb. 11, 1868 |
| 1,007,907 | Yaeger | Nov. 7, 1911 |
| 1,412,026 | Sturtevant | Apr. 4, 1922 |